March 15, 1927.

C. H. SCHURR 1,621,223

MACHINE FOR HOBBING GEARS, SHAFTS, AND OTHER ARTICLES

Filed Oct. 6, 1923   3 Sheets-Sheet 1

Inventor
Charles H. Schurr
By Fro A Pitts
Attorney

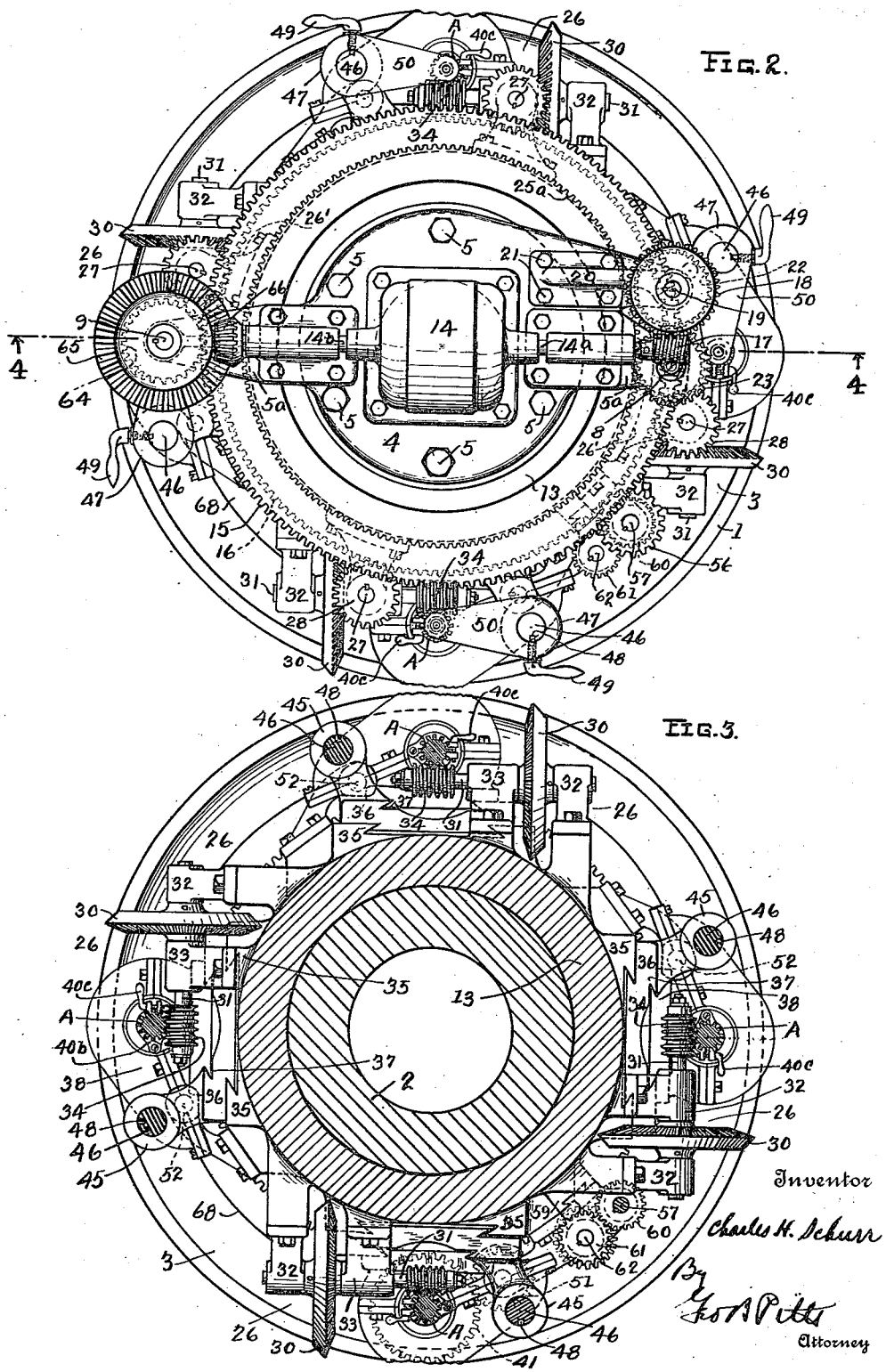

March 15, 1927. 1,621,223
C. H. SCHURR
MACHINE FOR HOBBING GEARS, SHAFTS, AND OTHER ARTICLES
Filed Oct. 6, 1923  3 Sheets-Sheet 3

Inventor
Charles H. Schurr
By
Attorney

Patented Mar. 15, 1927.

1,621,223

UNITED STATES PATENT OFFICE.

CHARLES H. SCHURR, OF CLEVELAND, OHIO, ASSIGNOR TO THE LEES-BRADNER COMPANY, OF CLEVELAND, OHIO, A CORPORATION OF OHIO.

MACHINE FOR HOBBING GEARS, SHAFTS, AND OTHER ARTICLES.

Application filed October 6, 1923. Serial No. 666,933.

This invention relates to a machine for hobbing gears, shafts and other articles.

One object of the invention is to provide an improved machine of this character wherein the operations of hobbing a plurality of work pieces are simultaneously carried on.

Another object of the invention is to provide an improved machine of this character that is relatively simple in construction and easily operated.

Another object of the invention is to construct a machine of this character capable of hobbing or cutting a large number of work pieces economically.

Another object of the invention is to construct a machine of this character wherein are provided a plurality of tools and work piece supports and an improved means for operating the tools and supports in predetermined relationships, respectively, to effect a rapid cutting or hobbing of the work pieces.

Another object of the invention is to so construct a machine of this character that minimum floor space is occupied and a relatively large output per day is attained at minimum labor and cost.

Other objects of the invention will be apparent to those skilled in the art to which my invention relates from the following description taken in connection with the accompanying drawings, wherein—

Fig. 2 is a top plan view of the machine.

Fig. 3 is a sectional view on the line 3—3 of Fig. 1.

Figure 1:
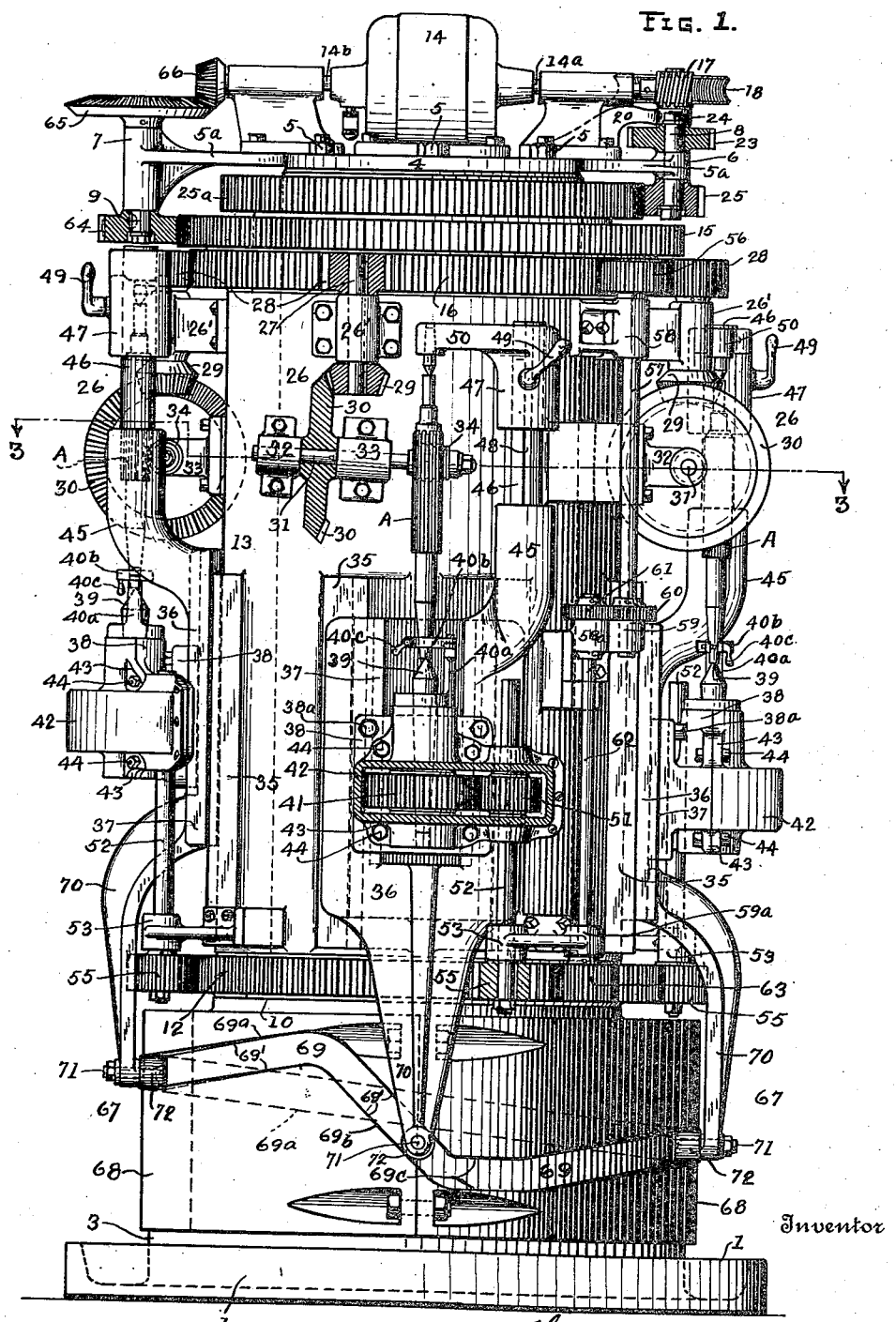
Fig. 1 is a side view or elevation of a machine embodying my invention.

Referring to the drawings, 1 indicates a frame or support for a relatively long tubular member 2 which forms a bearing for certain elements of the machine to be later referred to. The frame 1 and tubular member 2 are preferably formed integrally and so arranged that the latter extends vertically. As shown, and by preference, the frame 1 is of annular shape and somewhat enlarged, as compared to the tubular member 2, so that it may form a suitable base and supporting element for the tubular member and hence maintain the latter in an upright condition. The frame 1 may also be flanged, as shown at 3, to thereby provide an enlarged base to engage the floor and also a suitable trough for collecting materials, such as oil, grit and the like.

4 indicates a supplemental frame fixed to the upper end of the tubular member 2, preferably by a plurality of cap screws 5. The supplemental frame 4 is provided with arms 5ª extending laterally in opposite directions, which arms are provided with hollow bosses 6, 7, forming bearings for shafts 8, 9, respectively, to which reference will later be made.

Figure 4:
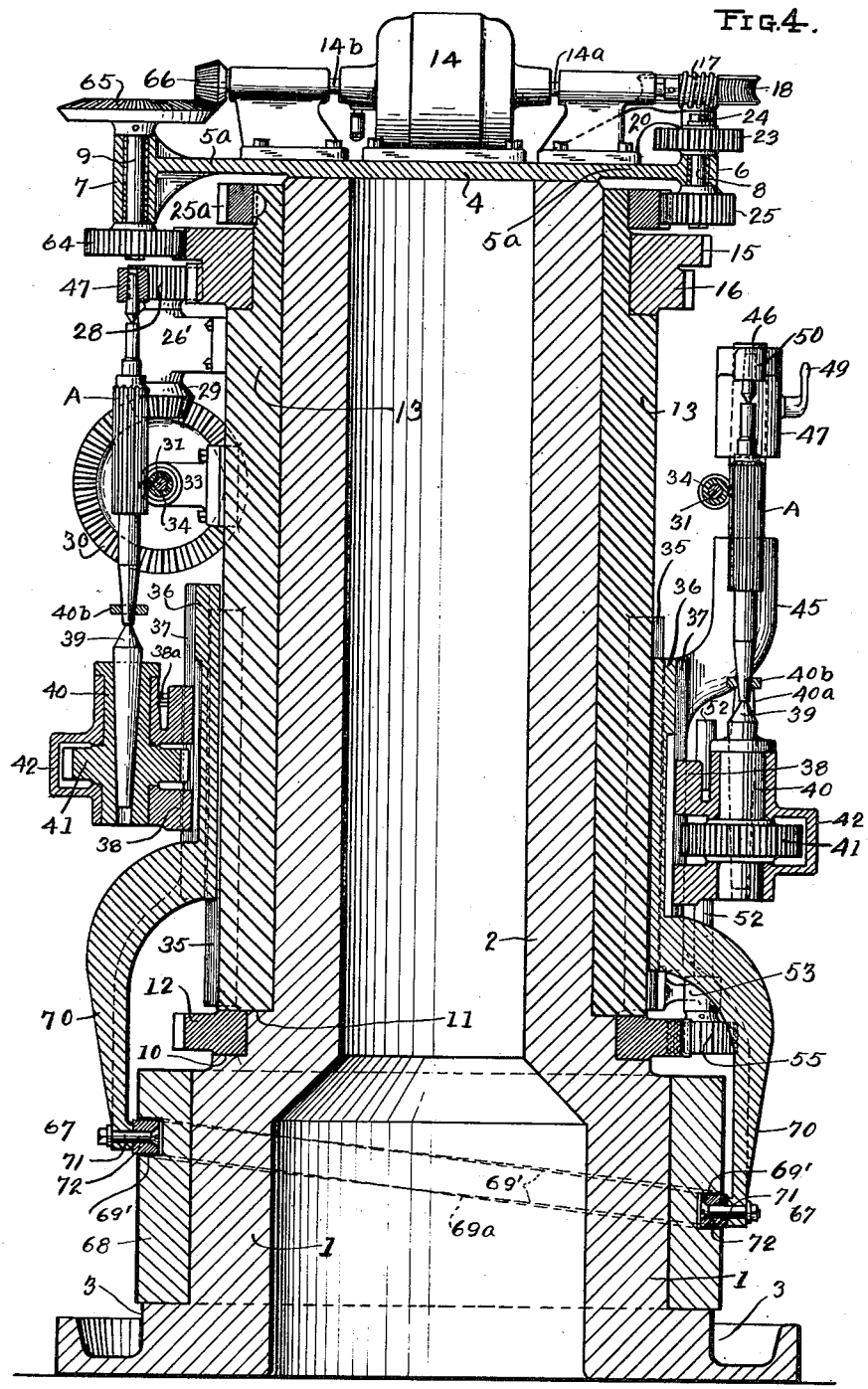
Fig. 4 is a vertical sectional view on the line 4—4 of Fig. 2.

The walls of the frame 1 and tubular member 2, at or adjacent the lower end of the latter, are shaped in any suitable manner to provide shoulders 10, 11, the former forming a seat for a ring gear 12 and the latter forming a seat or end wall for an annular supporting member 13. The ring gear rotatably fits the outer wall of the tubular member, and is rotated thereon in the manner to be later described. The supporting member 13 is of a size to rotatably fit the tubular member 2, so as to rotate thereon by suitable driving means which will later be described. As shown, the tubular member 2 is of a length to extend entirely through the rotary supporting member 13, this being for the purpose of forming a bearing from end to end of such member and also for the purpose of providing a simple supporting means for the supplemental frame 4 and a motor 14 which operates the various driven elements of the machine to be later referred to. At its upper end, the rotary supporting member 13 is reduced to form a seat and a bearing for a pair of ring gears 15, 16, which are preferably formed integrally, as shown in Fig. 4. The purpose of the ring gears 15, 16, will be later set forth. The motor 14 is preferably of the electric type. The shaft of the motor 14 extends in opposite directions, one such extension (14ª) thereof serving to rotate the supporting member 13 through the following instrumentalities: 17 indicates a worm fixed on the shaft end 14ª and meshing with a worm gear 18. The worm gear 18 is fixed to a shaft 19 supported in the free end of a bracket 20. The bracket 20 is secured to the supplemental frame 4 by suitable cap screws 21. 22 indicates a gear fixed to the shaft 19 and meshing with a gear 23, which in turn is fixed to the upper end of the shaft 8, preferably by a removable connection 24, for example a nut screw threaded on the end of the shaft. The lower end of the shaft 8 carries a gear 25 which meshes with a ring gear 25ᵃ, keyed in any well known manner to the supporting member 13—see Fig. 4. As shown, the free end of the tubular member 13 is slightly reduced to form a suitable seat for the gear 25ᵃ. From the foregoing description it will be seen that I provide between the motor shaft 14ᵃ and gear 25ᵃ a reduction driving mechanism so as to rotate the supporting member 13 at the desired speed. The gear 22 is also preferably removably connected to the shaft 19, such construction permitting these gears to be removed and gears of other sizes substituted to change the speed of the rotatable member 13, when desired.

In carrying out certain objects of the invention, I mount on the supporting member 13 a plurality of hobbing mechanisms, each indicated as an entirety at 26, whereby various operations incident to the positioning or loading of work pieces in position for hobbing, feeding of the work pieces relative to the tool and returning them to starting position, may be simultaneously carried on, so that an operative, standing at the loading and unloading position may load the mechanisms successively and unload them successively. The hobbing mechanisms 26 are all similar in construction and operation, so that the description of one thereof will suffice for the description of all.

Referring particularly to Fig. 1, wherein one of these mechanisms is shown in elevation, 26' indicates a bearing mounted on the supporting member 13 near its upper end and supporting a shaft 27. At its upper end the shaft 27 carries a gear 28 which meshes with the ring gear 16. At its lower end the shaft 27 carries a bevel pinion 29 which meshes with a bevel gear 30. The gear 30 is fixed to a shaft 31 mounted in suitable bearings 32, 33, carrying at its free end a suitable tool, such as a hob 34, which operates upon a work piece A. Since the tool comprises a hob, its supporting shaft 31 is inclined, in accordance with the pitch of the teeth of the hob, as shown in Fig. 1. For illustrative purposes, the work piece A shown in the drawings comprises a shaft that is to be provided with a plurality of splines, but it will be understood that, so far as my invention is concerned, a gear or other article may be substituted for engagement by the hob and a different type of tool may be used depending upon the character of the work piece and the operations to be performed thereon. 35 indicates a pair of guides or ways, of suitable shape, preferably formed integrally on the supporting member 13 and arranged to slidably support a slide 36. The guides 35 extend longitudinally of the supporting member 13 and are arranged near the lower end thereof, so as to support the work piece A in proper position for engagement by the tool 34, but it will be understood that the positions of the slide and tool could be reversed, if desired. The slide 36 is preferably provided with guides 37 which adjustably support a head stock 38. The head stock is formed with screw threaded openings to receive suitable screws 38ᵃ, by means of which the head stock 38 may be clamped to the slide in any desired position of adjustment, such adjustment being preferably provided so that the center 39 may be raised or lowered, depending upon the length of the work piece A to be operated upon.

The center 39 may be of any desired construction and fitted into a rotatable sleeve 40 which preferably forms the hub of a gear 41 (see Fig. 4). The head stock 38 is shaped to form, together with a cap member 42, a housing for the gear 41 and suitable bearings for the hub thereof, as shown in Fig. 4. The cap member and head stock are provided with lugs 43 having openings which are arranged to register to receive suitable clamping bolts 44 to secure the cap member 42 to the head stock 38. 45 indicates an arm preferably formed integrally with the slide 36 and extending upwardly from its upper end. The arm 45 supports a vertically extending rod 46 which forms a support and guide for a slidable tail stock 47. The rod 46 is preferably formed with a longitudinally extending groove 48, into which fits a key carried by the tail stock to prevent rotative movement of the latter thereon. The key is preferably shaped and constructed so that it may be expanded or pressed against the walls of the groove 48 by the operation of a handle or crank 49 in a well known manner. The tail stock 47 carries a laterally extending arm 50 which supports a center in alignment with the center 39 for the upper end of the work piece A. By reason of the adjustment of the head stock 38 and tail stock 47 on the slide 36 and also relative to each other, it will be seen that the work piece can be properly positioned or supported for engagement by the tool 34. As shown in Fig. 1 the head stock 38 and cap member 42 are also shaped to form a bearing and a housing for a gear 51, which meshes with the gear 41 to drive it. 52 indicates a shaft mounted at its lower end in a bearing 53, mounted on the supporting member 13. The upper end of the shaft 52 extends through openings formed between the abutting walls of the head stock 38 and cap member 41 and also through an opening formed axially in the gear 51, to which the shaft 52 is splined in a well known manner to effect rotation thereof while permitting the gear to slide endwise thereof due to the movement of the slide 36 upwardly and downwardly, as will be later set forth. Below the bearing 53 the shaft 52 is provided with a gear 55 which meshes with the ring gear 12. 40ª indicates an arm extending upwardly at one side of the sleeve 40. 40ᵇ indicates a pair of clamping elements, pivotally connected at corresponding ends to the free end of the arm and arranged to engage the lower end of the work piece to secure it to the sleeve 40, whereby rotation of the work piece is effected. The outer ends of the clamping elements 40ᵇ are provided with a clamping device of any suitable construction, the elements of which are operated by a handle 40ᶜ to cause the clamping elements to quickly engage the work piece or to disengage it, whereby the latter may be readily positioned between the centers and connected to the sleeve 40, and thereafter disconnected and removed. 56 indicates a gear secured to a shaft 57 and arranged to mesh with the ring gear 16. The shaft 57 is mounted in a pair of bearings 58, 59, provided on the supporting member 13 and carries at its lower end a change gear 60 arranged to mesh with a change gear 61 secured to the upper end of a shaft 62. The shaft 62 is mounted in suitable bearings 58ª, 59ª, mounted on the supporting member 13. At its lower end the shaft 62 carries a gear 63 which meshes with and drives the ring gear 12. The means for driving the ring gear 16 comprises a gear 64 fixed to the shaft 9 and meshing with the gear 15 and a bevel gear 65 mounted on the upper end of the shaft 9 and meshing with a bevel pinion 66 mounted on the free end of the motor shaft extension 14ᵇ. From the foregoing description, it will be seen that the motor 14, through the gears 66, 65, shaft 9, gears 64, 15, 16, 56, shaft 57, change gears 60, 61, shaft 62 and gear 63, operates the gear 12 from which driving connections are made to each of the hobbing mechanisms 26 by the respective gears 55, each of which meshes with the gear 12. It will also be seen that since the ring gear 12 is driven by the elements referred to from the ring gear 16 and the tool 34 is driven from the same gear, that the tool and work piece are rotated at a predetermined ratio or relationship. Where it is desired to change the speed of rotation of the work piece relative to the speed of rotation of the tool, suitably sized change gears 60, 61 may be substituted to effect the desired ratio.

67 indicates as an entirety means for operating the slides 36 successively to effect endwise movement of the work pieces, that is, feed thereof relative to the tools. Of these means, 68 indicates a tubular or ring shaped element mounted on the frame 1. The element 68 preferably comprises a pair of semi-circular elements arranged to abut end to end in close engagement with the outer wall of the frame 1. The walls of the semi-circular elements are formed with openings, those in one element being arranged to align with those in the other element so that suitable tie or clamping bolts can be positioned in the openings to secure the elements together and in position around the frame 1. The semi-circular elements preferably rest on the flange 3 of the frame 1. 69 indicates a cam formed in the annular member 68 and extending circumferentially therearound. The cam 69 preferably consists of a groove formed in the member 68 to provide upper and lower engaging walls 69' which effect movement of the slides 36 in the manner about to be described.

The cam 69 is provided with a plurality of sections as follows: A section 69ª of helical form to effect the feeding movement of the slides relative to the tool as the hobbing operations take place, a section 69ᵇ extending substantially in a helical direction, but opposite to the direction of the helical section 69ª and a straight section 69ᶜ extending from one end of the section 69ᵇ to the adjacent end of the section 69ª and connecting them together. 70 indicates an arm depending downwardly from each slide 36 and carrying at its lower end an inwardly extending stud shaft 71 on which is loosely mounted a roller 72. As shown in Fig. 4, the roller 72 fits in and engages the upper and lower walls 69' of the cam groove 69. Accordingly, as the supporting member 13 rotates, the rollers 72 will engage successively the sections of the cam 69 and thus effect movement of the slides upwardly and downwardly, as the cam groove is traversed; that is, referring particularly to Fig. 1, as the roller 72 for the mechanism 26 shown at the left side of the figure moves through the cam section 69ª, the walls 69' of the latter will cause the adjacent slide 36 to gradually move or feed upwardly, thereby feeding the work piece relative to the tool; at the end of the section 69ª, the roller 72 will move into the section 69ᵇ, the walls of which will move the slide 36 in the opposite direction, thereby returning the slide to the starting position ready to again feed a work piece relative to the tool; at the end of the section 69ᵇ, the roller 72 enters the cam section 69ᶜ, which being straight, or at right angles to the axis of the tubular member, will permit a pause or dwell of the slide or a period of rest at the end of its movement to the return position, whereby the operative can remove the finished work piece A and position a new work piece between the head and tail stock center. As will be understood from the drawings, the cam section 69ª is relatively long, whereas the cam section 69ᵇ is relatively short, the purpose of which is to provide the necessary relatively slow feed movement of the work piece during the hobbing operation and a relatively rapid return movement of the slide to position it at the starting point in a relatively short period of time. The semi-circular elements constituting the cam member 68 are removably secured together and to the frame 1 so that they can be readily disassembled and other elements substituted having cam sections properly shaped to feed work pieces a greater or less distance depending upon the length of that portion thereof that is to be cut or ground.

In the arrangement of the machine herein shown relatively little floor space is required. By providing a plurality of hobbing mechanisms upon a rotatable member and operating them successively, the various operations are carried on simultaneously. In the disclosed embodiment of my invention, these operations are effected by a master cam which may be readily changed to adapt the machine to various sizes and types of work pieces. For purposes of illustration I have shown four hobbing mechanisms uniformly spaced around the supporting member 13, but it will be understood that this number may be increased within the limits of the machine or decreased, as desired. It will be obvious that by enlarging the supporting member, any desired number of mechanisms may be mounted thereon.

To those skilled in the art of making machines of the class described, many changes in construction and modifications thereof and widely differing embodiments and applications of the invention will suggest themselves without departing from the spirit and scope thereof. My disclosures and the description herein are purely illustrative and are not intended to be in any sense limiting.

What I claim is:

1. In a machine tool of the class described, the combination of a main support, a supporting member rotatably mounted thereon, means for rotating said supporting member, a plurality of hobbing mechanisms mounted on said member, each comprising a rotatable hob spindle and a rotatable work spindle, and means for rotating the hob and work spindle of each hobbing mechanism at a relative velocity ratio suitable for hobbing.

2. In a machine tool of the class described, the combination of a main support, a supporting member rotatably mounted thereon, means for rotating said supporting member, a plurality of hobbing mechanisms mounted on said member, each comprising a rotatable hob spindle and a rotatable work spindle, means for rotating the hob and work spindle of each mechanism at a relative velocity ratio suitable for hobbing, and means for otherwise moving said spindles relatively to each other with a hob feeding movement.

3. In a machine tool of the class described, a vertical support adapted to stand upon its lower end as a base, and having on its upper end a power supplying means; and having between the two said ends the following parts; a supporting member rotatably mounted on the support, and adapted to be rotated thereon about a vertical axis; a plurality of mechanisms mounted on said supporting member, each comprising a rotatable hob spindle and a rotatable work spindle; a ring gear for rotatively driving the hob spindles; a ring gear for rotatively driving the work spindles; connections between the ring gears whereby the two spindles of each mechanism rotate at a constant pre-selected relative velocity ratio, and a device for moving one of the spindles of each mechanism relatively to the other; all of the said parts between the two said ends of the support being disposed in the general arrangement of a vertical cylinder.

4. In a machine of the class described, the combination of a support, a supporting member rotatably mounted thereon, a plurality of cutting mechanisms mounted on said supporting member, each said mechanism comprising a rotatable tool and a rotatable work-piece carrying element slidably mounted on said supporting member, means for rotating said member, ring gears rotatably mounted on said member, means for rotating said gears, driving connections between one of said gears and each of said tools, driving connections between the other of said gears and each of said elements, and cam means for moving said elements successively toward and from said tools, respectively.

5. In a machine of the class described, the combination of a support, a supporting member rotatably mounted thereon, a plurality of cutting mechanisms mounted on said supporting member, each said mechanism comprising a rotatable tool and a rotatable work-piece carrying element mounted to move relative to said tool on said supporting member, means for rotating said member, ring gears rotatably mounted on said member, means for rotating one of said gears, driving connections between the driven gear and the other gear, driving connections between one of said gears and each of said tools, driving connections between the other of said gears and each of said elements, and cam means for moving said elements successively toward and from said tools, respectively.

6. In apparatus of the class described, the combination of a main support, a supporting member rotatably mounted thereon, a plurality of hobbing mechanisms each having a work piece support slidably mounted on said member and carrying a work-piece spindle, and a tool spindle rotatably mounted on said member, means for rotating said member, means for rotating each work-piece spindle and tool spindle in co-ordinated relation to each other, a cam provided on said main support and surrounding the axis about which said supporting member rotates, and a device carried by each work-piece support and engaging said cam, whereby the latter moves the work-piece supports successively, first to feed the work-pieces relative to the tool and then to return them to starting position.

7. In apparatus of the class described, the combination of a main support, a supporting member rotatably mounted thereon, a plurality of hobbing mechanisms each comprising a work-piece support slidably mounted on said member and carrying a work spindle and a tool spindle rotatably mounted on said member, driven connections disposed on said supporting member, means for rotating said supporting member and driving said driven connections, operating connections between said driven connections and the work spindle and tool spindle of each hobbing mechanism, a cam carried by said main frame and disposed in concentric relation to said supporting member, and a device carried by each work-piece support and engaging said cam, whereby the latter slides said supports successively, first to feed each work-piece relative to the tool therefor and then back to starting position.

8. In an apparatus of the class described, the combination of a main support, a hobbing mechanism, means for moving the hobbing mechanism upon the main support in a closed path of movement, said hobbing mechanism comprising a hob spindle and a work spindle, and means for rotating the hob and work spindles at a relative velocity ratio suitable for hobbing.

9. In an apparatus of the class described, the combination of a main support, a hobbing mechanism, means for continuously moving the hobbing mechanism upon the main support in a closed path of movement, said hobbing mechanism comprising a hob spindle and a work spindle, and means for rotating the hob and work spindles at a relative velocity ratio suitable for hobbing.

10. In an apparatus of the class described, the combination of a main support, a hobbing mechanism, means for moving the hobbing mechanism upon the main support in a closed path of movement, said hobbing mechanism comprising a hob spindle and a work spindle, means for rotating the hob and work spindles at a relative velocity ratio suitable for hobbing, and means for otherwise moving one of said spindles relative to the other with a hob feeding movement.

11. In an apparatus of the class described, the combination of a main support, a hobbing mechanism, means for continuously moving the hobbing mechanism upon the main support in a closed path of movement, said hobbing mechanism comprising a hob spindle and a work spindle, means for rotating the hob and work spindles at a relative velocity ratio suitable for hobbing, and means for otherwise moving one of said spindles relative to the other with a hob feeding movement.

12. In a machine tool of the class described, a vertical support adapted to stand upon its lower end as a base and having on its upper end a power supplying means, and having also the following parts; a supporting member rotatably mounted on the main support and adapted to be rotated thereon about a vertical axis, a plurality of mechanisms mounted on said supporting member each comprising a rotatable hob spindle and a rotatable work spindle, a common means for rotatively driving the hob spindles in unison, a common means for rotatively driving the work spindles in unison, connections between the two means whereby the hob and work spindles of each mechanism rotate at a constant relative velocity ratio, and a device for causing relative bodily movement between the hob and work spindles of each mechanism; all of the said parts being disposed in the general arrangement of a vertical cylinder.

13. In a machine tool of the class described a main support, a supporting member rotatably mounted on the main support, a plurality of mechanisms mounted on said supporting member each comprising a rotatable hob spindle and a rotatable work spindle, a common means for rotatively driving the hob spindles in unison, a common means for rotatively driving the work spindles in unison, connections between the two means whereby the hob and work spindles of each mechanism rotate at a constant relative velocity ratio, and a device for causing relative bodily movement between the hob and the work spindles of each mechanism.

14. In a hobbing apparatus, a hobbing mechanism, means for supporting the mechanism for movement in a closed path, means for so moving the mechanism, said hobbing mechanism comprising a hob spindle and a work spindle, and means for rotating the hob and work spindles at a relative velocity ratio suitable for hobbing.

15. In a hobbing apparatus, a hobbing mechanism, means for supporting the mechanism for movement in a closed path, means for so moving the mechanism, said hobbing mechanism comprising a hob spindle and a work spindle, and means for rotating the hob and work spindles at a relative velocity ratio suitable for hobbing, and means for otherwise moving one of said spindles relative to the other with a hob feeding movement.

16. In an apparatus of the class described, the combination of a main support, a hobbing mechanism, means for moving the hobbing mechanism upon the main support in a closed path of movement, said hobbing mechanism comprising a hob spindle and a work spindle, means for rotating the hob and work spindles at a relative velocity ratio, suitable for hobbing, and means relative to which the moving hobbing mechanism as a whole moves for otherwise moving one of said spindles relative to the other with a hob feeding movement.

17. In an apparatus of the class described, the combination of a main support, a plurality of hobbing mechanisms, means for moving the hobbing mechanisms upon the main support in a closed path of movement, each of said hobbing mechanisms comprising a hob spindle and a work spindle, means for rotating the hob and work spindles of each mechanism at a relative velocity ratio suitable for hobbing, and a cam for otherwise causing relative movement between the spindles of each hobbing mechanism, said movement being a hob feeding movement of one spindle relative to the other.

18. In an apparatus of the class described, the combination of a main support, a hobbing mechanism, means for moving the hobbing mechanism upon the main support in a closed path of movement, said hobbing mechanism comprising a hob spindle and a work spindle, means for rotating the hob and work spindles at a relative velocity ratio suitable for hobbing, and means for causing a hob feeding relative movement between the spindles.

19. In an apparatus of the class described, the combination of a main support, a hobbing mechanism, means for moving the hobbing mechanism upon the main support in a closed path of movement, said hobbing mechanism comprising a hob spindle and a work spindle, means for rotating the hob and work spindles at a relative velocity ratio, suitable for hobbing, and means relative to which the moving hobbing mechanism as a whole moves, for causing a hob feeding relative movement between the spindles.

In testimony whereof, I have hereunto subscribed my name.

CHARLES H. SCHURR.